(12) United States Patent
Schubert et al.

(10) Patent No.: US 7,766,495 B2
(45) Date of Patent: Aug. 3, 2010

(54) REFLECTOR SHAPES FOR LIGHT EMITTING DIODE-POLARIZED LIGHT SOURCES

(75) Inventors: Martin F. Schubert, Troy, NY (US); Sameer Chhajed, Troy, NY (US); Jong Kyu Kim, Watervliet, NY (US); E. Fred Schubert, Troy, NY (US); Jaehee Cho, Suwon-si (KR)

(73) Assignee: Samsung LED Co., Ltd., Suwon (KR)

( * ) Notice: Subject to any disclaimer, the term of this patent is extended or adjusted under 35 U.S.C. 154(b) by 221 days.

(21) Appl. No.: 12/213,791

(22) Filed: Jun. 24, 2008

(65) Prior Publication Data
US 2008/0316751 A1 Dec. 25, 2008

Related U.S. Application Data

(60) Provisional application No. 60/945,979, filed on Jun. 25, 2007.

(51) Int. Cl.
*F21V 7/00* (2006.01)

(52) U.S. Cl. .................. 362/19; 362/296.07; 362/347; 257/98

(58) Field of Classification Search .................. 362/19, 362/235, 241, 243, 245, 247, 296.01, 296.05–296.08, 362/296.1, 341, 347–350, 800; 257/98, 79; 313/113
See application file for complete search history.

(56) References Cited

U.S. PATENT DOCUMENTS

| | | | |
|---|---|---|---|
| 7,408,201 B2 * | 8/2008 | Keuper et al. | 362/19 |
| 7,470,042 B2 * | 12/2008 | Ayabe et al. | 362/297 |
| 2003/0016539 A1 * | 1/2003 | Minano et al. | 362/347 |

* cited by examiner

*Primary Examiner*—Bao Q Truong

(57) ABSTRACT

A light-emitting device including a light source that exhibits polarization anisotropy and a reflector that is shaped so that for light emitted in at least two directions from the light source, the angle between the dominant polarization directions after reflecting from the reflector is smaller than the angle between the dominant polarization directions before reflecting from the reflector. In the light-emitting device the light source may be a light-emitting diode chip or one of a plurality of light sources.

3 Claims, 6 Drawing Sheets

REFLECTOR SHAPES FOR LIGHT EMITTING DIODE-POLARIZED LIGHT SOURCES

CROSS-REFERENCE TO RELATED APPLICATIONS

This application claims the benefit of U.S. Provisional Application No. 60/945,979, filed Jun. 25, 2007, the disclosure of which is incorporated herein by reference.

BACKGROUND

1. Field

The present invention relates generally to reflector shapes for light emitting devices and specifically to shapes designed to directly generate vertically emitted polarized light.

2. Description of the Related Art

High efficiency and power, long lifetime, small size, and the wide range of wavelengths available are reasons why light-emitting diodes (LEDs) are becoming increasingly important in areas such as sensing and imaging, general illumination and liquid crystal display (LCD) backlighting. A key benefit provided by LEDs is the ability to tune properties such as wavelength or color temperature to meet the needs of specific applications. However, the control of one property in particular—the optical polarization—has remained elusive. Polarized LEDs would be extremely useful particularly for LCD backlighting but also for imaging and communications. Accordingly, there is a need for a polarized LED source, which is enabled by a polarization-enhancing reflector design matched to the emission characteristics of GaInN LEDs so that light incident upon the reflector is redirected, and through selective polarization rotation by the reflector exhibits an enhanced polarization ratio.

Previously it has been reported that the light emitted in certain directions by 20 GaInN LEDs epitaxially grown on (0001) oriented sapphire substrates shows some degree of polarization. Polarization effects have also been demonstrated with LEDs grown on non-polar or semi-polar substrates. Studies of GaInN LEDs on sapphire substrates with multiple quantum well (MQW) active regions emitting at 460 nm revealed that light emitted from the side facets of the LED chips is dominantly polarized in the plane of the quantum wells, with values as high as 7:1 for the ratio of in-plane polarized light to normal-to-plane polarized light's. However, despite the measured polarization characteristics of unpackaged chips, conventional packaged LEDs were found to be completely unpolarized. This is attributed to the use of reflectors which do not preserve the inherent polarization properties of the LED chips. These reflectors typically exhibit continuous rotational symmetry and simply take the rays emitted in different directions and reflect them upwards. When two orthogonally polarized beams of equal intensity are combined, the result is unpolarized light.

SUMMARY

A light-emitting device including a light source that exhibits polarization anisotropy and a reflector that is shaped so that for light emitted in at least two directions from the light source, the angle between the dominant polarization directions after reflecting from the reflector is smaller than the angle between the dominant polarization directions before reflecting from the reflector.

In the light-emitting device the light source may be a light-emitting diode chip.

In the light-emitting device the light source may be one of a plurality of light sources.

The reflector shape exploits the polarization characteristics of light emitted from the side facets of GaInN LEDs in order to directly generate vertically emitted (i.e. normal to the plane of the LED chip) polarized light. This reflector design varies the optical path based upon the direction of light emission in that all light emitted by the LED that is incident on the reflector is directed upwards. However, depending upon the direction of the emitted light, the polarization may also be rotated by some angle. This concept is illustrated in FIG. 1. Through the selective polarization rotation, all side emitted light—which is initially polarized in the plane of the quantum wells—is polarized along a single direction when it leaves the reflector.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

In the following detailed description of various embodiments, reference is made to the accompanying drawings that form a part hereof, and in which are shown by way of illustration, and not of limitation, specific embodiments in which the subject matter may be practiced, The embodiments illustrated are described in sufficient detail to enable those skilled in the art to practice the teachings disclosed herein. Other embodiments may be utilized and derived therefrom, such that compositional, structural, and logical substitutions and changes may be made without departing from the scope of this disclosure. Examples and embodiments merely typify possible variations. Individual components and functions are optional unless explicitly required, and the sequence of operations may vary. Portions and features of some embodiments may be included in or substituted for those of others. The following description is, therefore, not to be taken in a limiting sense.

Figure 1:
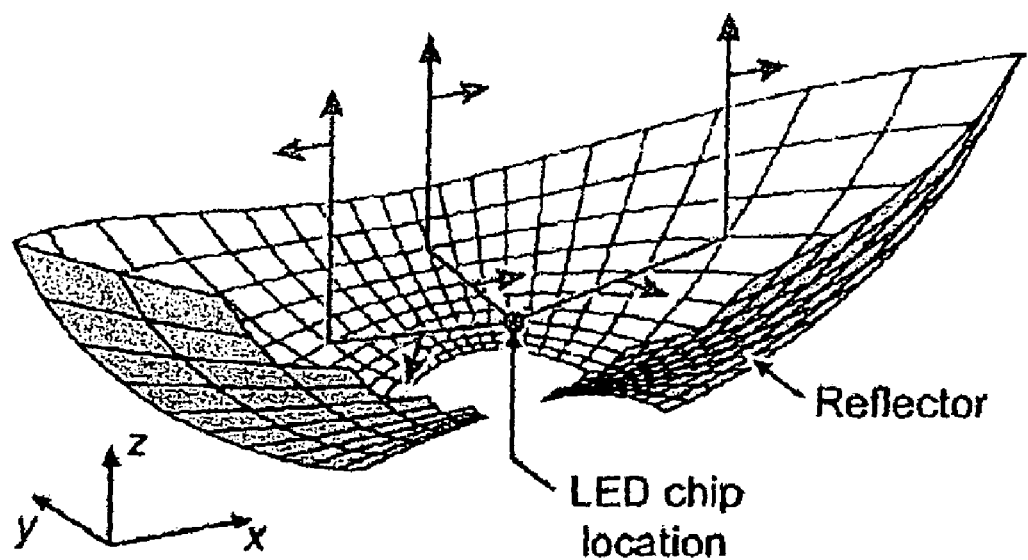
FIG. 1 is a perspective view of the polarization-enhancing reflector concept according to the present invention.
Figure 2:
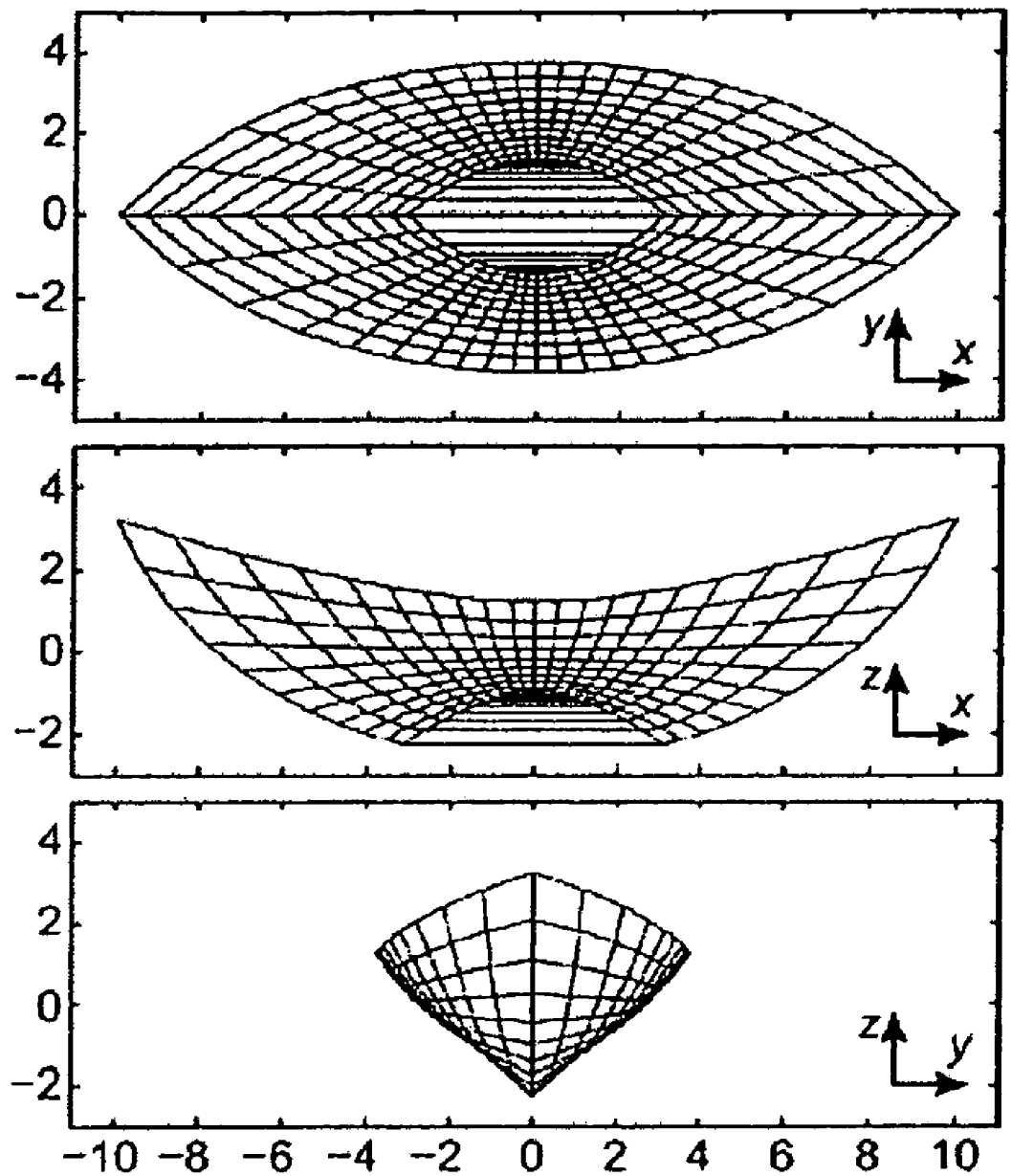
FIG. 2 is a wireframe view of the polarization-enhancing reflector concept according to the present invention.
Figure 3:
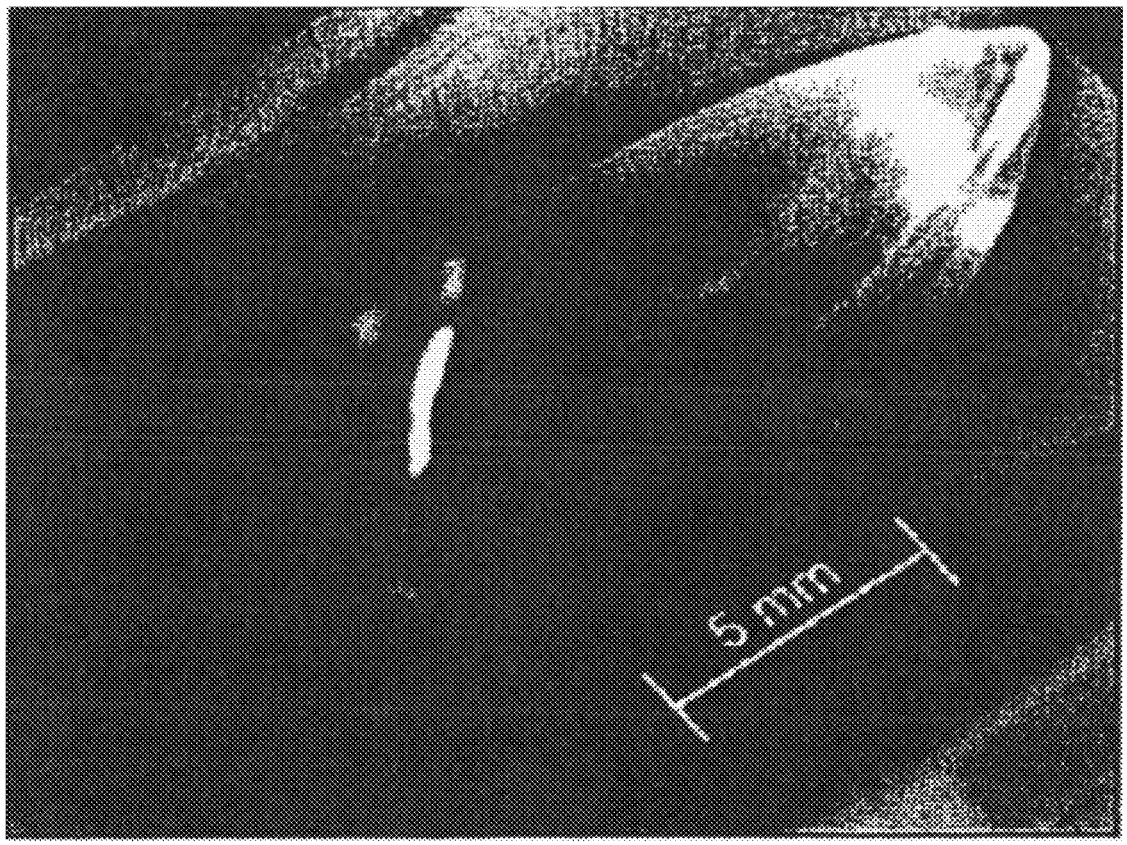
FIG. 3 is a photographic view of the polarization-enhancing reflector concept according to the present invention.

The reflector shape is determined using the following algorithm. In calculations the light source is assumed to be located at the origin and emit light polarized in the quantum well plane. The reflector shape is defined in terms of a rectangular grid of points in spherical coordinates in which the azimuthal angle $\Theta$ and zenith angle $\phi$ for each point are fixed and spaced at regular intervals. The radial coordinate r for each point on the grid is initially unknown. By grouping three points on the grid, a triangle is formed. The r-values for these three points are then optimized in order to maximize the figure of merit, which is chosen to be the product of (1) transmission through a linear polarizer lying in the xy-plane above the reflector which allows x-polarized light to pass and (2) $|\cos(\phi_{final})|$, where $\phi_{final}$ is the zenith angle of the propagation direction for a beam after reflection. This figure of merit ensures that the light which leaves the reflector has the desired polarization and travels in a close-to-vertical direction. It would be possible to change the figure of merit in order to tailor the far-field emission pattern of the final device. Once one triangle has been found, it is possible to form a new triangle by selecting a single new point, which is again optimized. This process is continued until the entire reflector shape is determined. The optimized reflector shape was calculated for beams that are emitted with zenith angles between $\phi=72°$ and $\Theta=126°$. For $\phi$ greater than 126°, the reflector shape is linearly extrapolated from calculated points; for $\phi$ less than 72°, light rays do not strike the reflector. The reflector is fabricated from aluminum by a computer controlled milling machine and then extensively polished by hand to give the surface a specular optical finish. A slot is machined in the center at the bottom in order to facilitate mounting of the LED chip. A wireframe view and photograph of the reflector are shown in FIG. 2 and FIG. 3, respectively.

Figure 4:
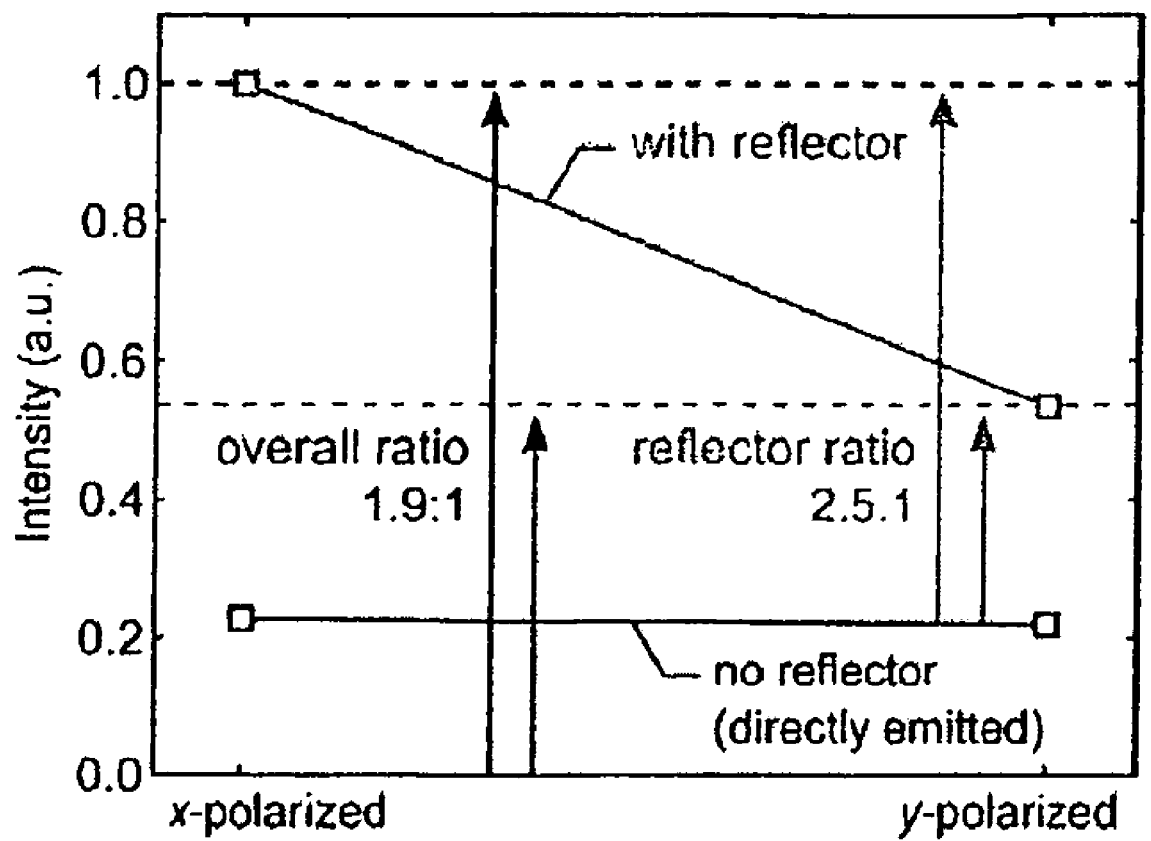
FIG. 4 is a graph showing the measured intensity for x-polarized and y-polarized light both with and without the reflector of the present invention.

The GaInN LED used to test the reflector emits at 460 nm and is 200×450 µm² in size. The chip is mounted on the tip of a pin which has been flattened to make a level surface for mounting and is held in place with a small amount of adhesive. The flattened pin tip is circular in shape and approximately 180 µm in diameter, which allows the edges of the chip to overhang. The pin which serves as the LED chip holder is held fixed in place and the reflector cup is positioned on a 3-axis stage so the pin protrudes through the slot in the base of the reflector. The position of the reflector with respect to the LED chip is optimized using a large-area (25 mm diameter) photodetector and polarizer located approximately 40 mm above the top of the reflector. This detector position allows the capture of nearly all light emitted in vertical and close-to-vertical directions. The reflector position is adjusted in order to maximize the polarization ratio, defined as the ratio of intensity with the polarizer aligned in the x-direction to the intensity with the polarizer aligned in the y-direction. The intensity of x-polarized and y-polarized light is also measured in the absence of the reflector in order to determine the polarization ratio for only that light which strikes the reflector. The measurement results are shown in FIG. 4. The total polarization ratio, which combines reflected and directly emitted (i.e. light not striking the reflector) light, is measured to be 1.9:1, while ratio for reflected light only is 2.5:1. Due to the detector position and its large area, this may be considered the average polarization ratio for light traveling in the vertical direction. By comparison, an unpackaged or conventionally packaged LED has a ratio of 1:1 for vertically emitted light.

Figure 5:
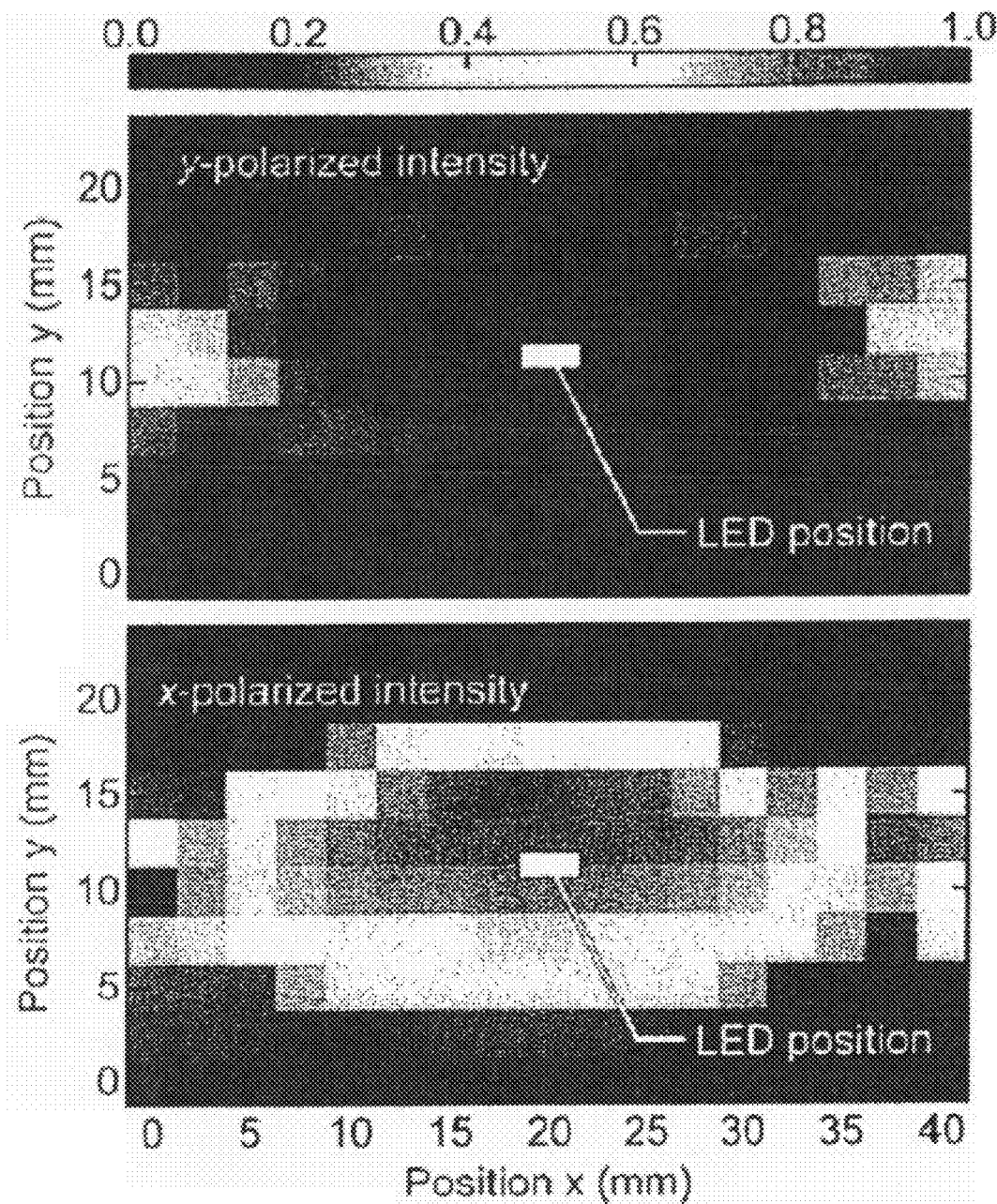
FIG. 5 is a graph showing the measured intensity for x-polarized and y-polarized light as a function of position.
Figure 6:
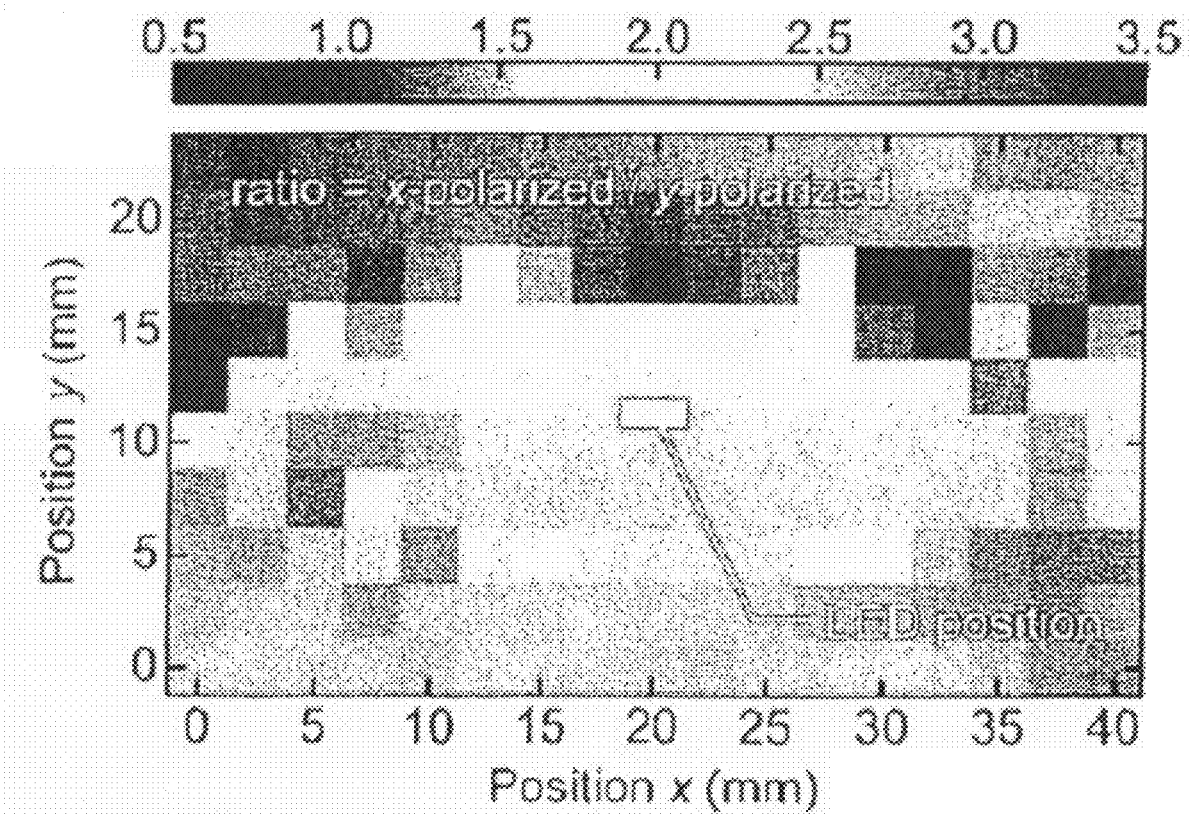
FIG. 6 is a graph showing the ratio of x-polarized to y-polarized light as a function of position.

Measurements of the x- and y-polarization intensities as a function of position above the reflector are also performed. A detector with a 2.5 mm aperture is scanned over a 22.5×40 mm² area in the xy-plane above the reflector. This measurement reveals the farfield emission pattern of the LED with reflector. FIG. 5 shows the measured intensity as a function of detector position for both polarizations. FIG. 6 shows the ratio of the two polarizations. The peak ratio observed is approximately 3.5:1 and there are several points which have ratios above 3:1. FIGS. 5 and 6 reveal an asymmetry in both the intensity and ratio as a function of position; this difference is likely due to an asymmetry in the reflector itself. The fabrication method used relies heavily on work done by hand and does not produce a perfect result. When the reflector is examined, the surface does appear specular in general, but close inspection reveals some non-specular regions where the finish is compromised by small scratches as well as regions where the reflector shape deviates from the intended shape. This indicates that the performance would be further increased through the use of improved methods in the manufacture and polishing of the reflector. It would also be possible to increase performance by designing a deeper reflector that reflects light with $\phi<72°$, which would allow the capture of more highly-polarized side emission. As a result, the maximum values measured for the polarization ratio should be taken as an indicator of the performance potential of the reflector. The combination of side-emitting LEDs and the polarization-enhancing reflector together with optimized encapsulant shapes could lead to highly polarized and highly efficient light sources useful for LCD backlighting and other applications.

In conclusion, the design of a reflector structure which takes advantage of the polarized emission characteristics of GaInN LEDs provides a light source that emits predominantly linearly polarized light. Measurements show that reflected light traveling in close-to-vertical directions has an intensity ratio of desired polarization to undesired polarization of 2.5:1, while the combination of reflected and directly emitted light is polarized with an average ratio of 1.9:1. In addition, a scan of the farfield emission pattern shows local polarization ratios as high as 3.5:1. The reflector design and the concept of providing a different optical path dependent upon the direction and polarization of light through selective polarization rotation are both highly promising for the development of polarized light sources individually tailored for specific applications, such as LCD backlighting.

An aspect of the present invention further provides that the LED structure is grown by metal-organic chemical vapor deposition on oriented sapphire substrates and consists of a 2 pm thick undoped GaN buffer layer, an n-type GaN lower cladding layer, a GaInN/GaN multiple quantum well active region, a p-type GaN upper cladding, and a highly doped p-type GaN contact layer. LED mesa structures are obtained by standard photolithographic patterning followed by chemically-assisted ion-beam etching using C12 and Ar to expose the n-type cladding layer. The ohmic contact for n-type GaN is Ti/Al/Ti/Au annealed at 650° C. for 1 min. Then, AgCu alloy (2 nm)/ITO (200 nm) is deposited on p-type GaN by electron-beam evaporation and 10 annealed at 500° C. under 02 ambient to form transparent ohmic contact to p-type GaN. After processing the sapphire substrate is thinned to approximately 80 pm thickness and then diced into individual LED chips.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A light-emitting device comprising:
    a light source that exhibits polarization anisotropy; and
    a reflector that is shaped so that for light emitted in at least two directions from the light source, the angle between the dominant polarization directions after reflecting from the reflector is smaller than the angle between the dominant polarization directions before reflecting from the reflector.

2. The device in claim 1, wherein the light source is a light-emitting diode chip.

3. The device in claim 1, wherein the light source is one of a plurality of light sources.

* * * * *